(12) United States Patent
Bradshaw et al.

(10) Patent No.: US 7,430,586 B2
(45) Date of Patent: Sep. 30, 2008

(54) SYSTEM AND METHOD FOR MANAGING MEMORY

(75) Inventors: Elliott Bradshaw, Belmont, MA (US); Geoffrey Dreher, Nashua, NH (US)

(73) Assignee: Zoran Corporation, Sunnyvale, CA (US)

( * ) Notice: Subject to any disclaimer, the term of this patent is extended or adjusted under 35 U.S.C. 154(b) by 1023 days.

(21) Appl. No.: 10/123,933

(22) Filed: Apr. 16, 2002

(65) Prior Publication Data

US 2003/0195943 A1 Oct. 16, 2003

(51) Int. Cl.
*G06F 15/16* (2006.01)

(52) U.S. Cl. .................. 709/217; 709/220; 709/201; 709/225; 709/226; 711/141; 711/170

(58) Field of Classification Search ................. 709/212, 709/217, 245–246, 223, 220, 201, 225; 710/20, 710/52; 707/100–102; 717/128; 370/401
See application file for complete search history.

(56) References Cited

U.S. PATENT DOCUMENTS

| | | | |
|---|---|---|---|
| 6,598,141 B1 * | 7/2003 | Dussud et al. ............. | 711/170 |
| 6,646,652 B2 * | 11/2003 | Card et al. ................. | 345/645 |
| 6,654,760 B2 * | 11/2003 | Baskins et al. ............ | 707/101 |
| 6,658,652 B1 * | 12/2003 | Alexander et al. ......... | 717/128 |
| 6,675,264 B2 * | 1/2004 | Chen et al. ................ | 711/141 |
| 6,738,970 B1 * | 5/2004 | Kruger et al. ............. | 717/175 |
| 6,980,558 B2 * | 12/2005 | Aramoto .................... | 370/401 |
| 6,981,046 B2 * | 12/2005 | Baumeister et al. ....... | 709/226 |

OTHER PUBLICATIONS

"Document Objet Model (DOM)," http://www.w3.org/DOM/, Sep. 26, 2005, 3 pages.
"Introduction of the Document Object Model," http://www.brainjar.com/dhtml/intro/, Sep. 26, 2005, 17 pages.

* cited by examiner

*Primary Examiner*—Nathan J. Flynn
*Assistant Examiner*—Jude J Jean Gilles
(74) *Attorney, Agent, or Firm*—Davis Wright Tremaine LLP

(57) ABSTRACT

A method and system for accessing data by an application program is disclosed. The application program issues a data request to a data storage system. In response, the data storage system loads into memory a data node corresponding to the data request. The data node is stored as part of a data structure. The data storage system returns a reference to the application program, which is then used to access the node. The application program may further instruct the data storage system to de-allocate a node when available memory is low or when it is no longer using the node.

23 Claims, 8 Drawing Sheets

SYSTEM AND METHOD FOR MANAGING MEMORY

BACKGROUND

1. Field of the Invention

The invention relates to managing memory, and in particular to providing a data storage system for an application to use in accessing data.

2. Background Information

Document data is increasingly being stored and/or processed in a structured format using a data structure standard. In particular, data structure standards are used to provide a set of definitions that can be used to separate data content from a particular presentation. In this manner, the content can be quickly accessed and re-rendered in a different context. It has previously been recognized that by separating content from presentation it would be possible to share data on a platform-independent basis. One such early effort was the Electronic Data Interchange ("EDI"). Similarly, the Hypertext Markup Language ("HTML"), which has enjoyed widespread acceptance over the World Wide Web, represents another effort to normalize document data structures for facilitating the sharing of data between different computer systems.

While many data structure standards have been developed, one exemplary standard which has gained widespread recognition is the Extensible Markup Language ("XML"). XML, like HTML, evolved from the Standard Generalized Markup Language ("SGML"). XML is a document-based organizational standard that provides a set of rules for defining descriptions of structure and content in a document. XML uses tags that are similar to HTML tags, except that HTML tags provide a way of formatting information, while XML tags only organize and describe the data itself. That being the case, it is typically the case that XML documents must be parsed using a processing algorithm, as must XHTML and SGML documents.

Regardless of the data structure standard in use, there are two dominant approaches to navigating document data. The first type of navigation method, or parser, reads the document and transforms the data into its tree-structured equivalent. The most common example of this is the Document Object Model ("DOM"), which is based on the notion of using nodes to navigate a document. DOM, and other tree-based parsers, enable application programs to navigate and manipulate document data by loading and storing the entire document in this tree structure. However, this approach suffers from the fact that it is a strong consumer of memory resources. A DOM version of a document can easily consume two to three times as much memory as the original document would have. This can have a significant impact on applications which run in memory-poor environments, such as would be the case with embedded system applications.

The second approach to parsing document data is to analyze the document as a stream of text, rather than as a tree. In particular, as the various components of a document are encountered, the parser raises events (such as start and end elements), and reports such events back to the application program. A common example of an event-based parser is the Simple API for XML ("SAX"), which reports events to the application program using callbacks, which cause the application program to implement event handlers for the different types of events. While the event-based parser of a document requires much less memory than its DOM version would, event-based parsers can only process the current node and those nodes that are younger siblings or children of the current node. Moreover, the application program will have no control over the navigation through the document data.

Accordingly there is a need in the art for a system and method of managing memory which does not suffer from the aforementioned drawbacks.

BRIEF SUMMARY

A system and method for accessing data by an application program is disclosed. In one embodiment, the method comprises issuing a request, by an application program, for a reference, and storing a node in a memory as part of a data structure in response to said request, said data structure to include at least a portion of a data set and to be organized as a plurality of nodes. The method further includes returning the reference to the application program, and accessing the node, by the application program, using the reference.

Other embodiments are disclosed and claimed herein.

DETAILED DESCRIPTION

One aspect of the invention relates to providing a system for parsing document data which is to be provided to an application program in response to a request from the application program. In one embodiment, this functionality is provided by a data storage system which receives and parses data, such as document data, from a data source. The data storage system parses a data set to determine node boundaries and relationships, and creates a data structure in memory comprised of nodes. In one embodiment, the scope of the data structure created by the data storage system corresponds to application program requests and represents some fraction of the total data set. In one embodiment, the requests are navigation function calls which cause the data storage system to load a desired node into the data structure in memory. The data structure may be stored in shared system memory that is accessible by both the application program and the data storage system, according to one embodiment. The data structure may be updated by the data storage system based on subsequent application program requests.

Another aspect of the invention relates to providing a system for an application program to navigate through document data and access specific nodes of the data structure. This is done by returning references to the application program corresponding to the desired nodes. A reference may be a physical memory address where the node is stored, or may be a virtual memory address. It should be appreciated that the reference may also be a table index, an associative memory address, or any other means of identifying a storage location for the node sought. In one embodiment, when an application program issues a navigation function call to the data storage system, the data storage systems updates the data structure in system memory as needed, and returns one or more references to the application program corresponding to the requested node(s). The application program may then access the nodes in the data structure using the corresponding references returned to it.

Yet another aspect of the invention relates to releasing nodes from the data structure, when no longer being used by the application program. In one embodiment, nodes are de-allocated (i.e., have no effective reference assigned), but are yet retained in memory. In another embodiment, nodes that are de-allocated are also discarded from system memory. In another embodiment, de-allocated nodes are discarded from memory automatically, while in another embodiment, de-allocated nodes are discarded from system memory as a function of system memory limitations.

Figure 1:
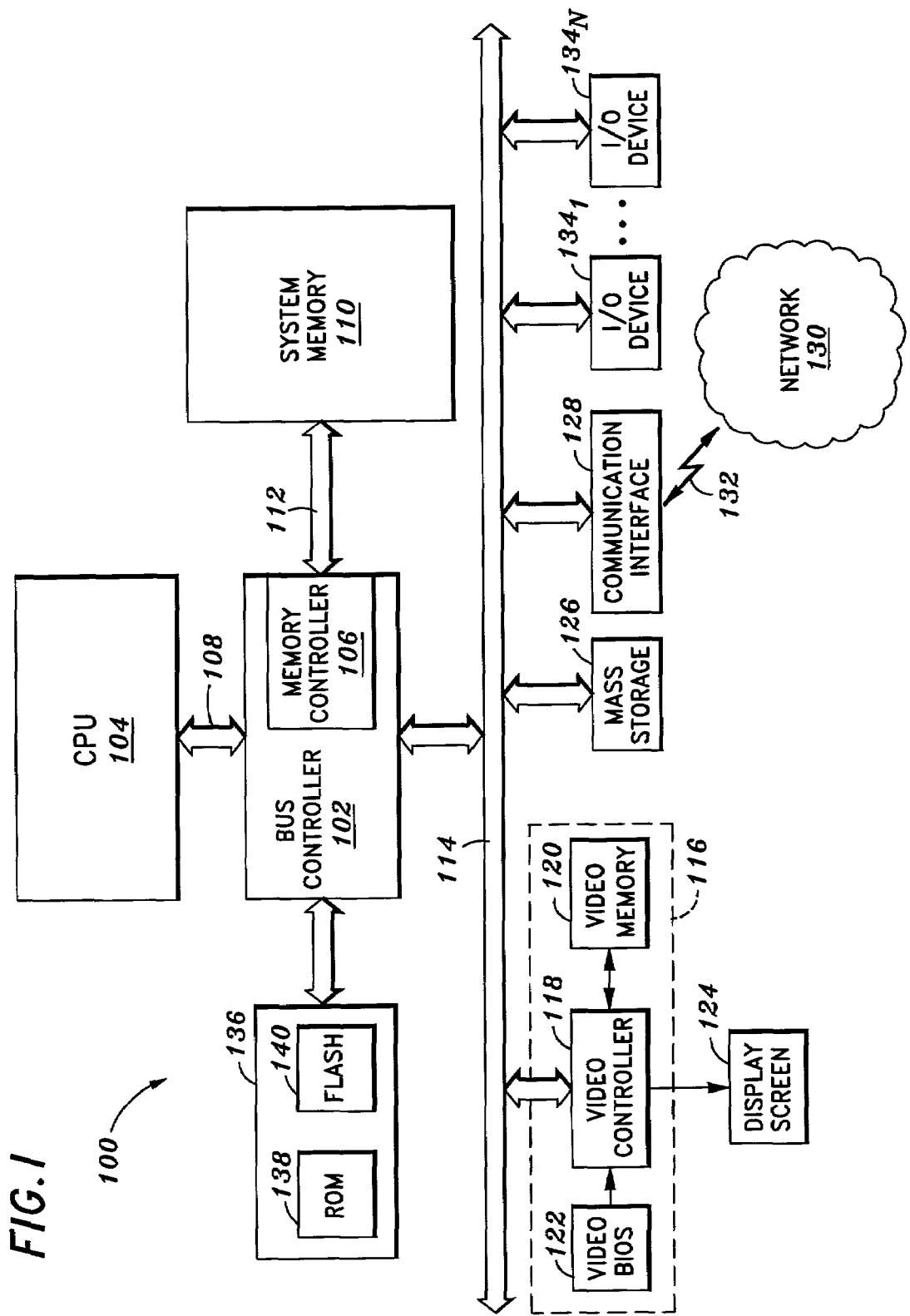
FIG. 1 is a block diagram of one embodiment of a processor system 100 capable of implementing a data storage system, according to the principles of one aspect of the invention.

Referring now to the figures, one embodiment of a processor system 100 that implements at least one aspect of the invention is depicted in FIG. 1. Processor system 100 comprises a processor or a central processing unit (CPU) 104. The illustrated CPU 104 may include an Arithmetic Logic Unit (ALU) for performing computations, a collection of registers for temporary storage of data and instructions, and a control unit for controlling operation for the processor system 100. In one embodiment, the CPU 104 includes any one of the x86, Pentium™, Pentium II™, and Pentium Pro™ microprocessors as marketed by Intel™ Corporation, the K-6 microprocessor as marketed by AMD™, or the 6×86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing CPU 104. Moreover, the CPU 104 is not limited to a microprocessor, but may take on other forms such as microcontrollers, digital signal processors, reduced instruction set computers (RISC), application specific integrated circuits, and the like. Although shown with one CPU 104, processor system 100 may alternatively include multiple processing units.

The CPU 104 may be coupled to a bus controller 102 by way of a CPU bus 108. The bus controller 102 includes a memory controller 106 integrated therein, though the memory controller 106 may be external to the bus controller 102. The memory controller 106 provides an interface for access by the CPU 104 or other devices to system memory 110 via memory bus 112. In one embodiment, the system memory 110 includes synchronous dynamic random access memory (SDRAM). System memory 110 may optionally include any additional or alternative high speed memory device or memory circuitry. The bus controller 102 is coupled to a system bus 114 that may be a peripheral component interconnect (PCI) bus, Industry Standard Architecture (ISA) bus, etc. Coupled to the system bus 114 are a graphics engine or a video controller 118, a mass storage device 126, a communication interface device 128, and one or more input/output (I/O) devices 134. The video memory 120 is used to contain display data for displaying information on the display screen 124. In another embodiment, the video controller 118 is coupled to the CPU 104 through an Advanced Graphics Port (AGP) bus.

The mass storage device 126 includes (but is not limited to) a hard disk, floppy disk, CD-ROM, DVD-ROM, tape, high density floppy, high capacity removable media, low capacity removable media, solid state memory device, etc., and combinations thereof. The mass storage device 126 may include any other mass storage medium. The communication interface device 128 may include a network card, a modem interface, etc. for accessing network 130 via communications link 132. The I/O devices 134 may include a keyboard, mouse, audio/sound card, printer, and the like. The I/O devices 134 may also include the specialized display circuits and input circuits of an embedded system.

As is familiar to those skilled in the art, the processor system 100 may further include an operating system (OS) and at least one application program, which in one embodiment, are loaded into system memory 110 from mass storage device 126 and launched after POST. The OS may be any type of OS including, but not limited or restricted to, DOS, Windows™ (e.g., Windows 95™, Windows 98™, Windows 2000™, Windows XP™, Windows NT™, Windows NT Embedded™), Unix, Linux, OS/2, OS/9, Xenix, VxWorks, etc. The operating system is a set of one or more programs which control the processor system's operation and the allocation of resources. The application program is a set of one or more software programs that performs a task desired by the user.

Figure 2:
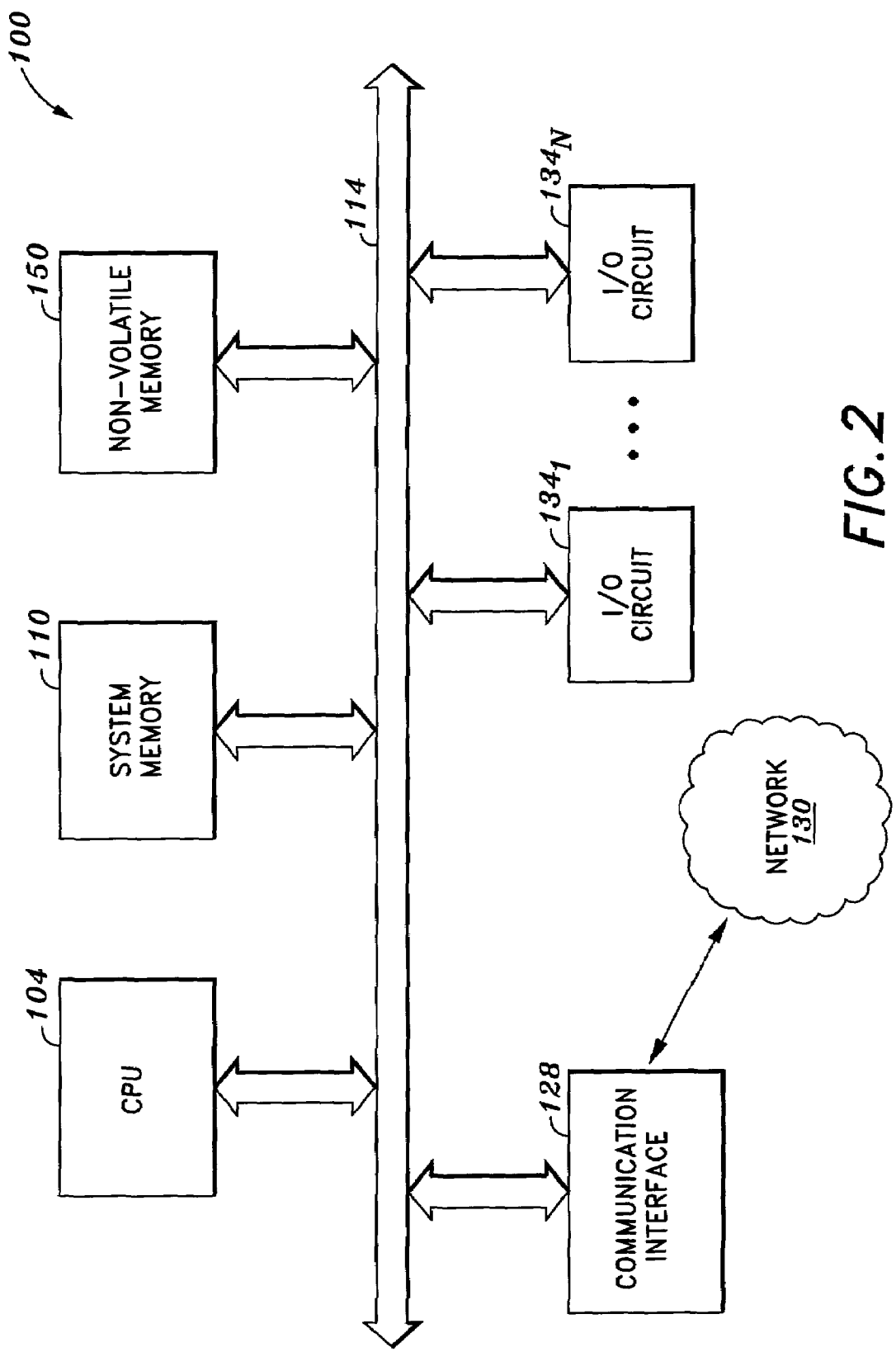
FIG. 2 is a block diagram of another embodiment of processor system 100 capable of implementing a data storage system consistent with the principles of one aspect of the invention.

In one embodiment, processor system 110 is an embedded system, such as an application card, network appliance or other consumer product. FIG. 2 illustrates one embodiment of processor system 100 when implemented as an embedded system. In this embodiment, CPU 104, system memory 110, non-volatile memory 150, communication interface 128, and I/O circuits 134 are connected via system bus 114. The non-volatile memory 150 may be programmable read-only memory (PROM) and may contain the Basic Input/Output System ("BIOS") for the processor system 100. Where processor system 100 is an embedded system, I/O circuits 134 will correspond to the particular specialized circuits used by the embedded system. By way of providing non-limiting examples, the I/O circuits 134 may correspond to the input-output circuitry for a cellular phone, personal digital assistant ("PDA"), or other consumer electronic device using embedded system technology. In addition, communication interface 128 and/or one or more of the I/O circuits 134 may be used to provide data to the system memory 110. Such data may be loaded from a fixed-medium storage device, such as a floppy or hard disk, or may be received over a communications link connected to network 130. It should be appreciated that the network can be a local area network ("LAN"), a wide area network ("WAN"), the Internet, or any other data network.

In accordance with the practices of persons skilled in the art of computer programming, the invention is described below with reference to symbolic representations of operations that are performed by processor system 100, unless indicated otherwise. Such operations are sometimes referred to as being computer-executed. It will be appreciated that operations that are symbolically represented include the manipulation by CPU 104 of electrical signals representing data bits and the maintenance of data bits at memory locations in system memory 110, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 3A:
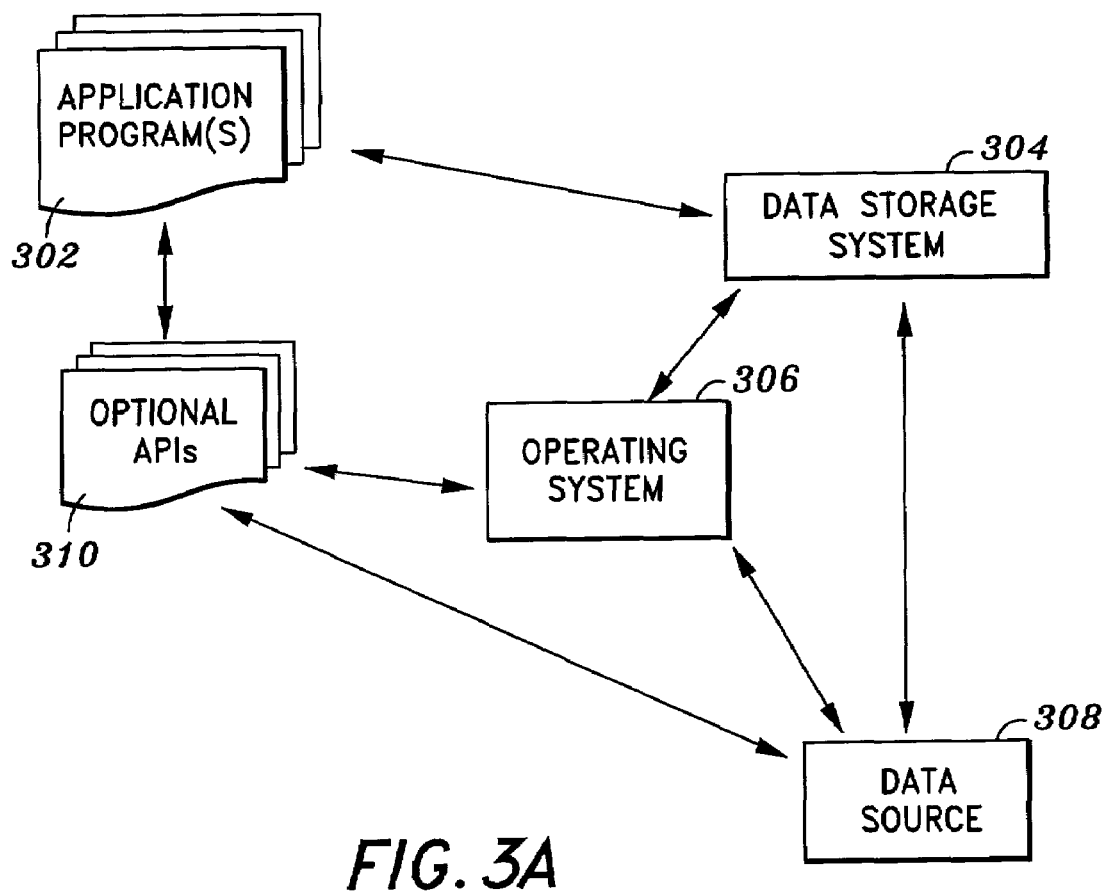
FIG. 3A is a block diagram illustrating one embodiment of data storage system interaction.

FIG. 3A is a block diagram showing the interaction between the data storage system 304 and one or more application programs 302. In one embodiment, data storage system 304 is executable software code stored on non-volatile memory 150, while in another embodiment data storage system 304 is stored in system memory 110. Similarly, application program 302 may be stored either in system memory 110 or non-volatile memory 150. Where mass storage 126 is used, data storage system 304 and/or application program 302 may be loaded from the mass storage 126 into system memory 110 for execution by CPU 104. Alternatively, application program 302 may be executed remotely from data storage system 304 and be in communication with data storage system 304 over network 130.

Where processor system 100 is an embedded system, application program 302 is comprised of specialized code for carrying out the specific function of the embedded system. For example, in one embodiment application program 302 may be an embedded Internet browser or embedded XML processor. Moreover, in the case of an embedded system, application program 302 and data storage system 304 may be stored on non-volatile memory, while data source 308 provides data to system memory 110 to be operated on by data storage system 304 and/or application program 302.

System memory 110 and/or non-volatile memory 150 may further be used to store operating system 306 and optional API programs 310, where optional APIs 310 are used to perform further processing of data received from data source 308. It should be appreciated that, in one embodiment, data source 308 is a serial source, such as a file stored on mass storage 126 or a data stream received over network 130. Similarly, the data provided by the data source 308 may be any data set capable of being represented in discreet segments and modeled as a series of nodes.

Moreover, in one embodiment, data storage system 304 is an Application Programming Interface ("API") which serves as a processing intermediary between an application program and a data set from data source 308. It should further be appreciated that data storage system 304 may be a portion of another API, or contained within another processing program. In addition, optional APIs 310 may be used to carry out additional rendering functions, such as those processing operations carried out by Cascading Style Sheets ("CSS"), Extensible Stylesheet Language ("XSL"), and Document Style Semantics and Specification Language ("DSSSL").

Figure 3B:
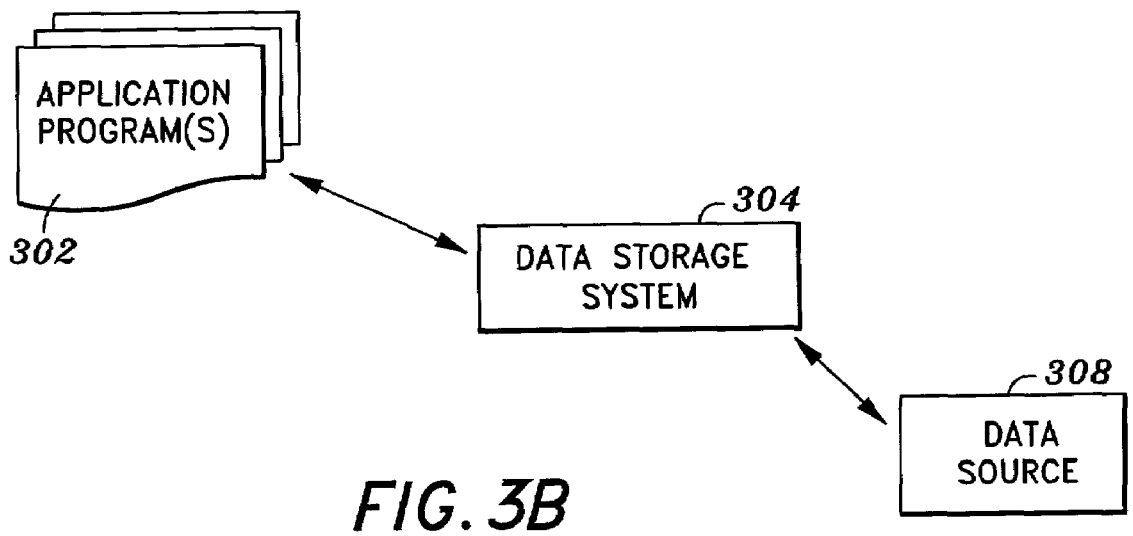
FIG. 3B is a block diagram illustrating another embodiment of data storage system interaction.

FIG. 3B illustrates an alternate embodiment in which optional APIs 310 are not used to further process the data from data source 308. Moreover, operating system 306 is not used, such as may be the case where processor system 100 is an embedded system. It should further be appreciated that application program 302 may be stored remotely from data storage system 304 and/or data source 308. In such an embodiment, application program 302 may interact with the data storage system 304 over network 130. Similarly, data source 308 may be remote from both data storage system 304 and/or application program 302.

Figure 4:
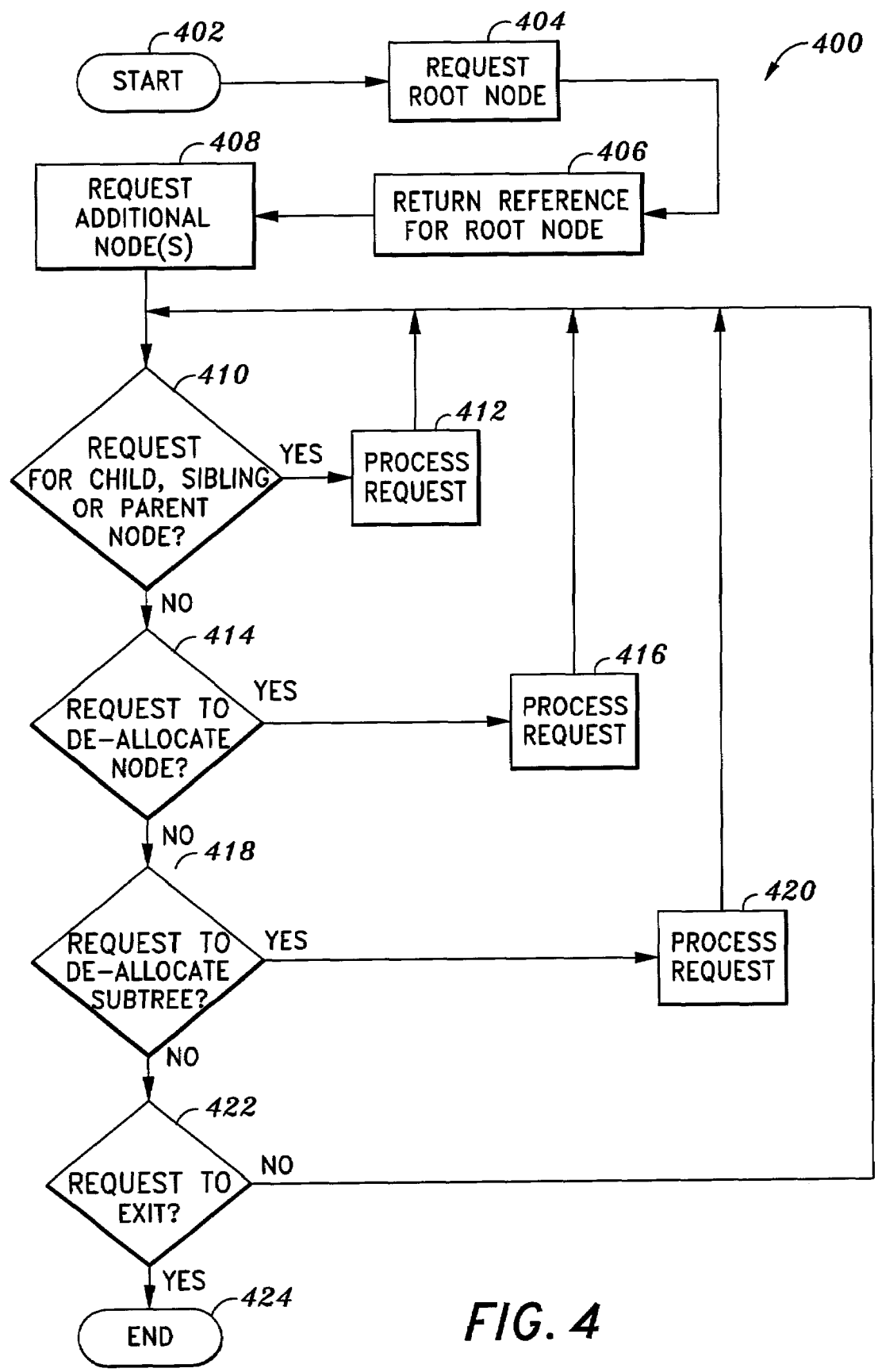
FIG. 4 is a process diagram of one embodiment of a process of handling application program requests by a data storage system, in accordance with one aspect of the invention.

FIG. 4 is a process diagram of how application program requests are handled by a data storage system, according to one embodiment. Process 400 begins at block 402 where data storage system 304 is initialized, which may, for example, coincide with a power-on function or an initialization sequence from an application program. At block 404 an application program, such as application program 302, issues a request for a reference to the root node of a data set. In one embodiment, the reference is a physical memory address where the node is stored, while in another embodiment the reference is a virtual memory address. It should be appreciated that the reference may be a table index, an associative memory address, or any other means of identifying a storage location for the node sought. It should further be appreciated that the initialization activity of block 402 may coincide with the request operation of block 404.

In response to this request, at block 406, the data storage system 304 may initialize internal data, such as any local variables or similar operating parameters. Where a data set is being sent via a communications stream, the data storage system 304 may also process the data input stream and allocate node storage as needed. Finally, a reference is returned to the application program 302 by the data storage system 304, according to one embodiment.

After receipt of a reference for the root node, the application program 302 may then request additional nodes at block 408. Data storage system 304, at decision block 410, makes a determination as to whether the additional node requested by the application program 302 at block 410 is a request for a child, sibling or parent node. In one embodiment, this request is in the form of a navigation function call. As is described in more detail below with reference to FIG. 7, the application program 302 may access specific data in a data set by issuing a series of navigation function calls which result in the data storage system 304 returning one or more references to one or more particular nodes.

Upon receiving a navigation function call, such as a request for a reference to a child, sibling or parent node, the data storage system 304 at block 412 processes the data from the data source 308 as needed to respond to the request. In one embodiment, the data storage system 304 also allocates node storage in system memory 110 and releases any previously de-allocated nodes to free any additional needed memory. Thereafter, the data storage system 304 returns one or more references to the node(s) requested, according to one embodiment. Thereafter, application program 302 has access to the nodes for which it has received references.

If, however, the request from the application program 302 was not a request for a node, process 400 moves to decision block 414 where a determination is made as to whether the request was to de-allocate a previously requested node. If so, this request is processed at block 416 and the node in question is de-allocated.

Where the request is determined to not be a node de-allocation request, process 400 moved to decision block 418 where a determination is made as to whether or not the request was a request to de-allocate a subtree. In one embodiment, a request to de-allocate a subtree would be a request to de-allocate a particular node and all of its descendants.

Finally, the request from the application program 302 may be a request to exit or terminate the data storage system 304, the determination of which is made at decision block 422.

Figure 5A:
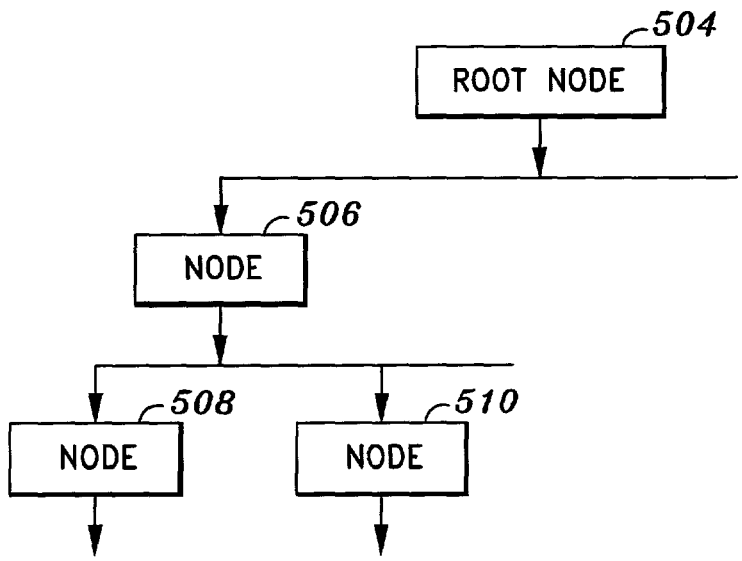
FIGS. 5A-5E are block diagrams of various possible memory usage states.

As discussed above, the data storage system 304 allocates system memory for nodes and returns references to the corresponding memory locations in response to application program 302 node requests. This process creates a system memory usage state. One such memory usage state is depicted in FIG. 5A. In the memory usage state of FIG. 5A, an application program 302 has made a root node request, such as was previously discussed in regards to block 404 of process 400. In response, system memory was allocated to the root node 504 and a corresponding reference returned to the application program 302. Moreover, in this embodiment, a subsequent request was made by the application program 302 for a child node 506 of the root node 504. Again, system memory was allocated and a reference returned. At some point thereafter additional requests were made for nodes 508 and 510. The requests, or navigation functions calls, may have been in the form of two child node calls, or may have been in the form of one child node call, follow by a sibling call. In either event, system memory was allocated for nodes 508 and 510 and the corresponding references returned to the application program 302.

Figure 5B:
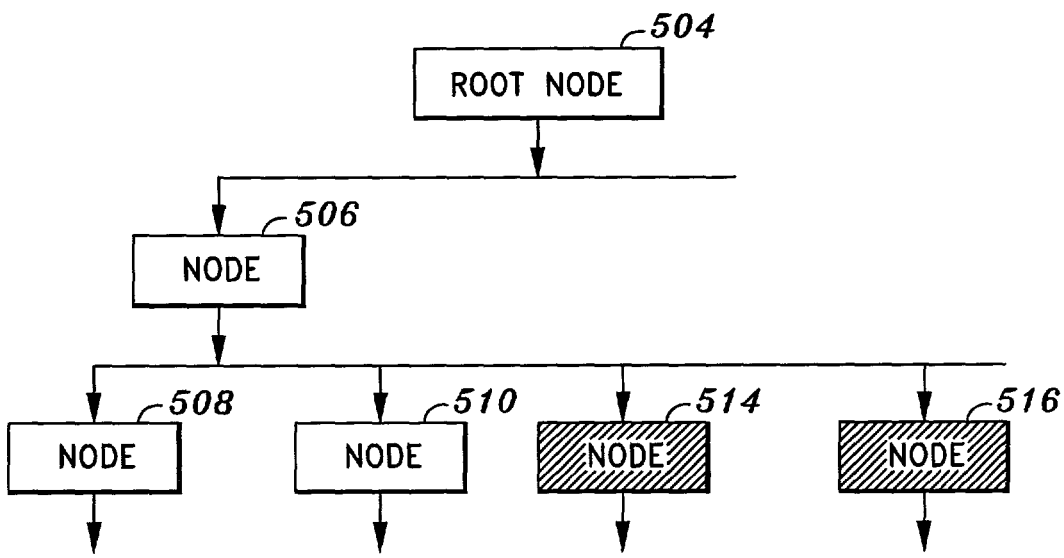

Referring now to FIG. 5B, in which a memory usage state is depicted where the data storage system 304 has pre-fetched nodes 514 and 516. Pre-fetched nodes are those nodes for which memory has been allocated, but for which no application program 302 request has been issued and no reference returned. To identify the fact that nodes 514 and 516 are not visible to the application program 302, they are depicted in hatching in FIG. 5B. Similarly, for FIGS. 5A-5E nodes depicted in non-hatched boxes are visible to the application program 302, while nodes depicted in hatched boxes are not.

Figure 5C:
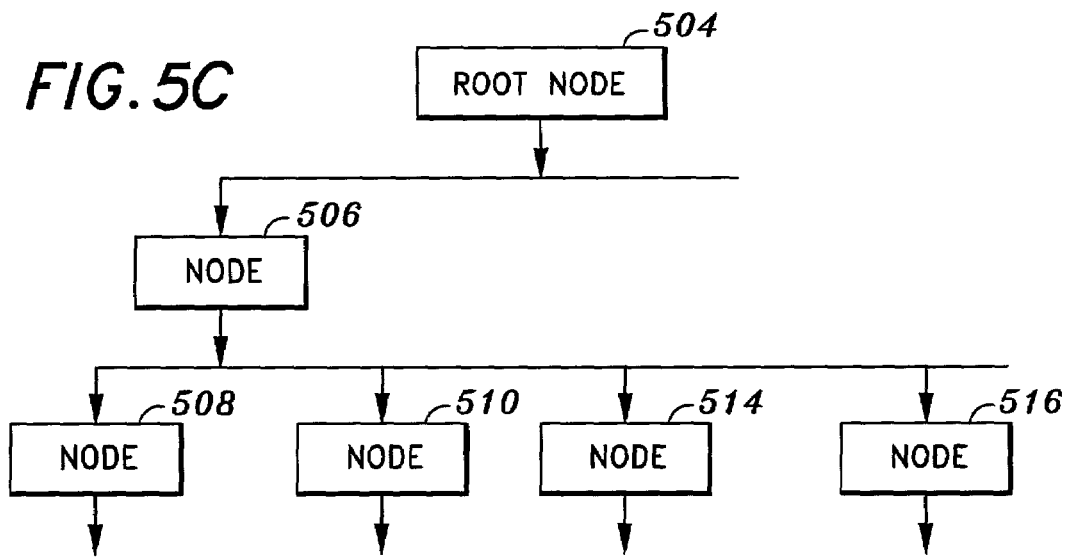

FIG. 5C illustrates the memory usage state where the application program 302 has requested additional nodes 514 and 516. In response, references are returned to the application program 302 indicating their location in system memory. Moreover, nodes 514 and 516 are no longer depicted in hatching to indicate that they are now visible to the application program 302.

Figure 5D:
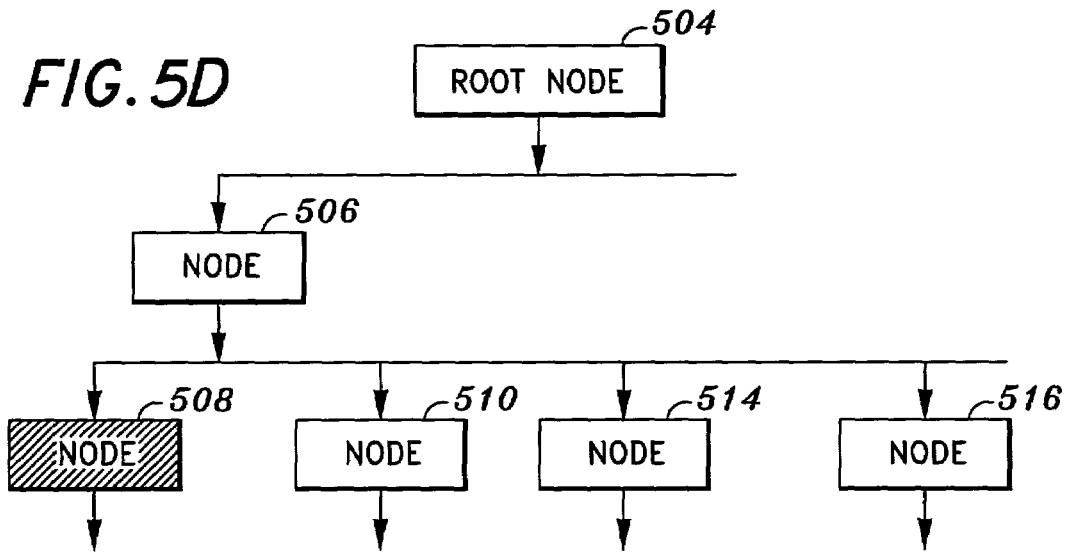
Figure 5E:
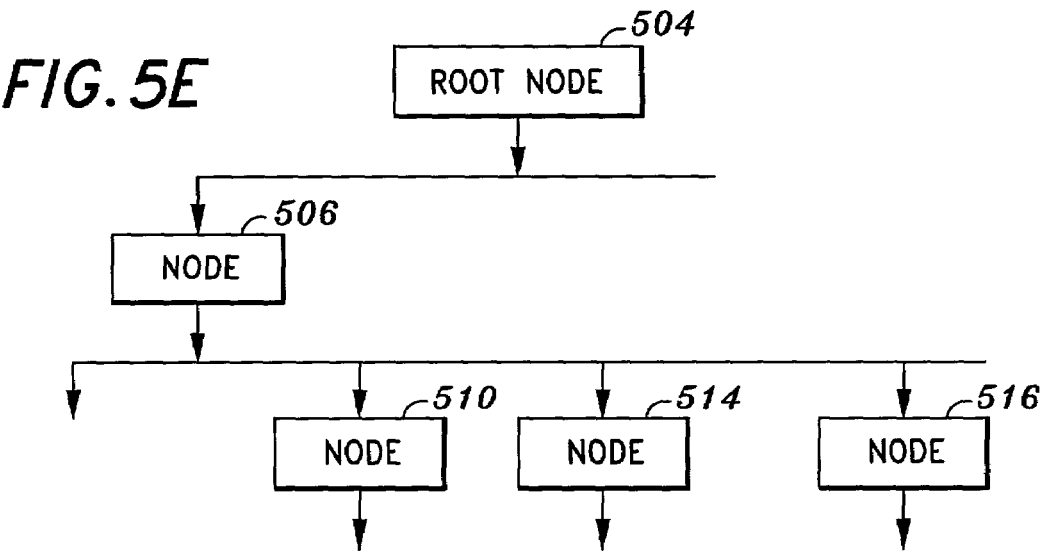

FIG. 5D is a memory usage state where the application program 302 has further requested that node 508 be de-allocated. Once a node is de-allocated by the application program 302, it is no longer visible to the application program 302. However, in the embodiment of FIG. 5D, node 508 continues to have memory allocated to it, even after the application program 302 has de-allocated it. Whereas in FIG. 5E, the data storage system 304 has chosen to discard de-allocated node 508. In one embodiment, data storage system 304 keeps de-allocated node 508 in memory until memory constraints require that it be discarded. In another embodiment, de-allocated node 508 is discarded upon being de-allocated by the application program 302, regardless of available memory.

Figure 6:
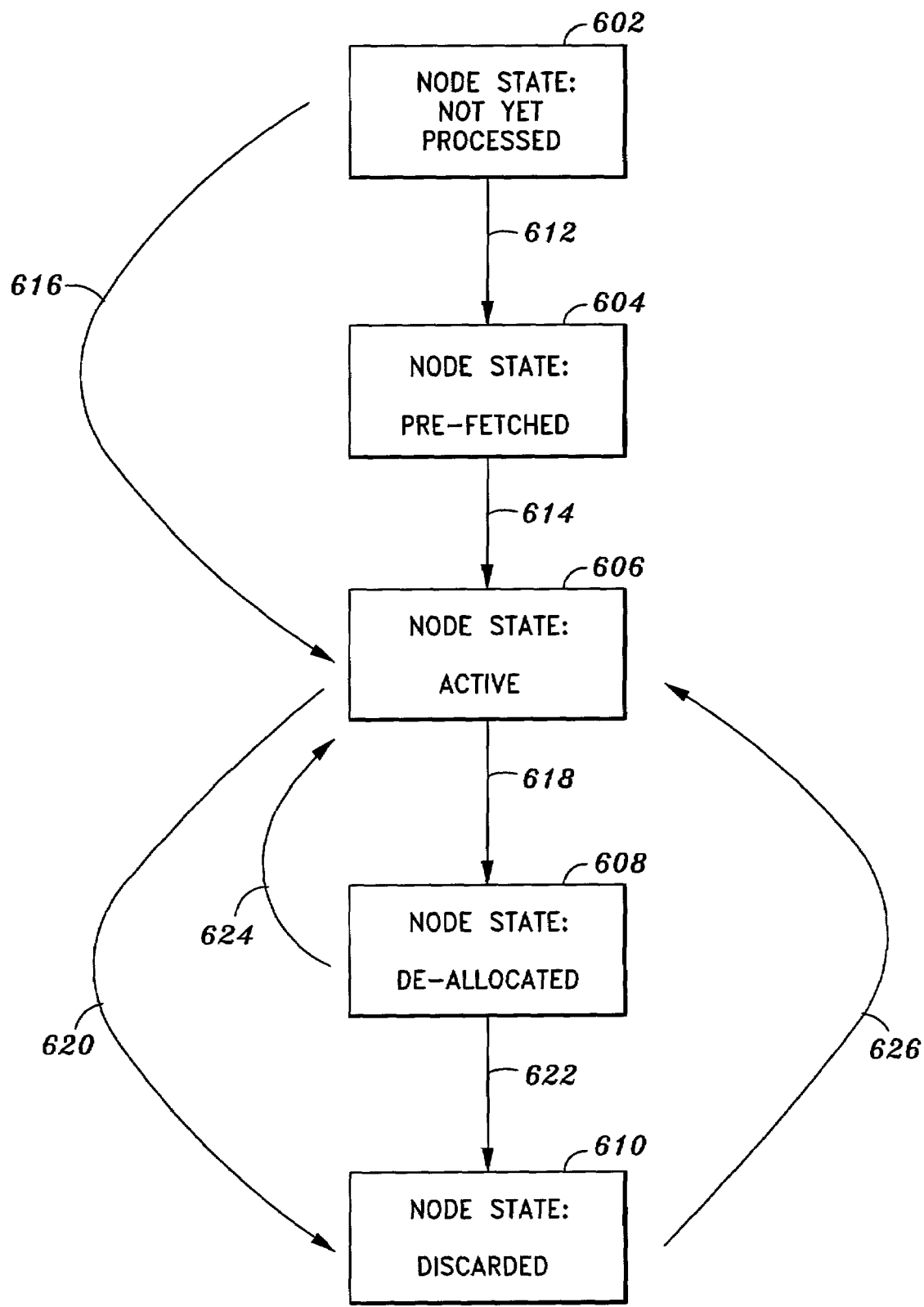
FIG. 6 is a block diagram depicting one embodiment of the node states and node transitions of one aspect of the invention.

Referring now to FIG. 6, the various node processing states and transitions are depicted. In particular, a node may be described as any one of the following: not yet processed, pre-fetched, active, de-allocated, and discarded.

As shown in FIG. 6, node state 602 corresponds with a node which has yet to be processed by a data storage system. Node state 604 corresponds with a node which has been read into system memory 110 by a data storage system 304, but not yet requested by the application program. Thus, in this state, the node would not be visible to the application program, according to one embodiment. Node state 606 relates to a node that has been loaded into memory, and for which a reference has been returned to the application program. Node state 608 relates to a node which the application program has indicated it no longer needs, but which still resides in system memory 110. Finally, node state 610 corresponds to a node which has been removed from memory.

Nodes transition through node states 602-610 under varying circumstances. In particular, node transition 612, which takes a node from node state 602 to node state 604, may occur when the data storage system determines that sufficient memory is available to pre-fetch the node into memory. In one embodiment, nodes are pre-fetched based on memory availability, while in another embodiment nodes are pre-fetched based, at least in part, on an application program's request patterns. It should be appreciated that such pre-fetching may be done to improve system efficiency and/or system response time.

A node may enter node state 606 (i.e., active state) by either node transition 614 or node transition 616. Node transition 614 occurs when an application program issues a request for node which has already been pre-fetched. In this case, the data storage system simply has to return a reference to the application program for the pre-fetched node already in memory. Alternatively, node transition 616 also takes a node to an active state and occurs when an application program requests a node which has yet to be processed. In this latter case, the data storage system allocates memory for the node and, when memory limitations require, releases one or more nodes that have been de-allocated, according to one embodiment. Thereafter, a reference may be returned to the application program for the now-active node.

Node transition 618, which takes a node from an active state (node state 606) to a de-allocated state (node state 608), occurs when the data storage system receives a de-allocation request from the application program. However, the data storage system continues to hold the node in memory.

Node state 610 may be achieved through node transition 620 or node transition 622. In the case of node transition 620, the data storage system receives a de-allocation request by the application program and decides to immediately discard the node, thereby freeing up previously occupied memory. Unlike node state 608, in which the node remains in memory, the data storage system may determine that the node should be immediately discarded due, for example, to a lack of available memory.

Another route to node state 610 is through node transition 622. In this case, the data storage system chooses to remove from memory a node which had been previously de-allocated. Node transition 622 may occur as memory limitations require.

Two other ways a node may achieve node state 606 is through node transition 624 and 626. In the case of node transition 624, an application program issues a request for a node which it had previously ordered de-allocated. In this case, the node is already in memory and the data storage system has only to return a reference to that location. Alternatively, node transition 626 occurs when an application requests access to a node which had been both de-allocated and discarded. In this case, memory must be re-allocated for the node and a corresponding reference returned to the application program.

Figure 7:
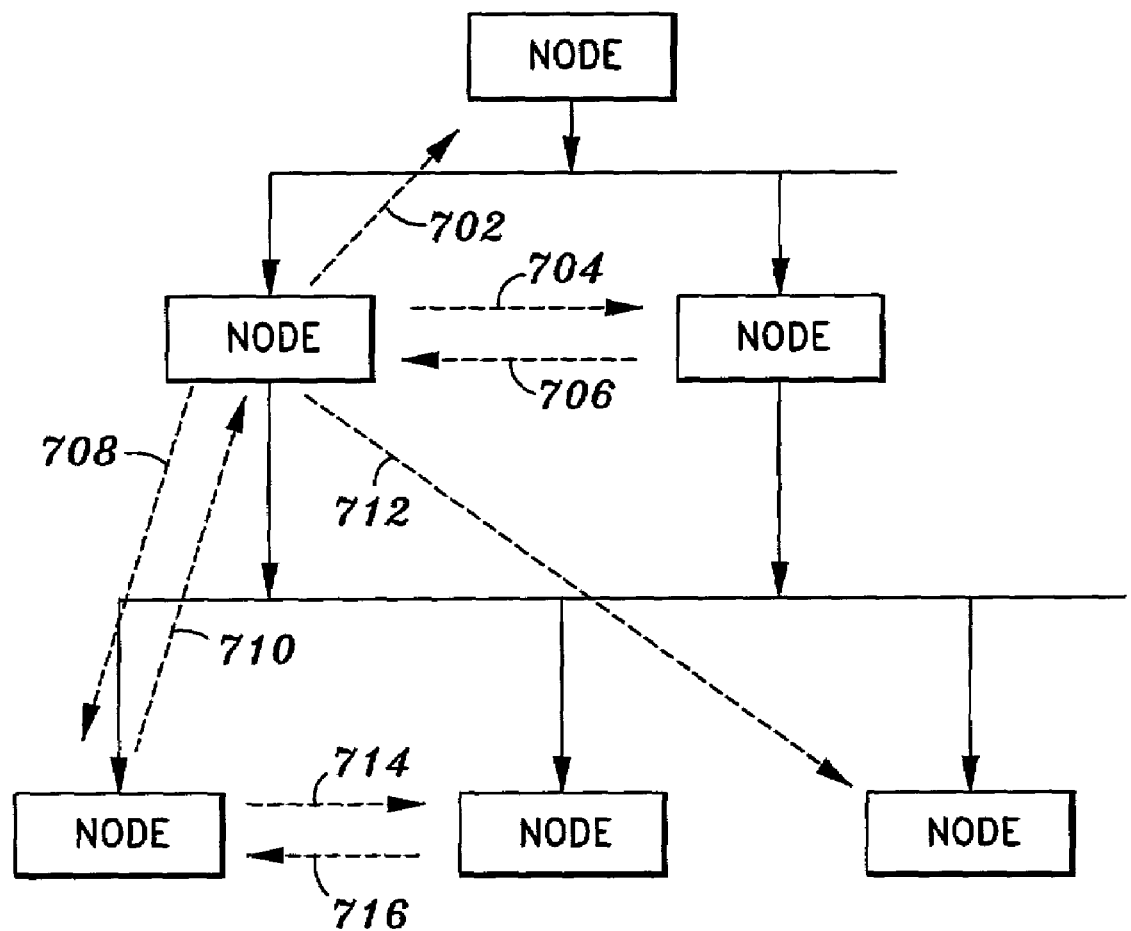
FIG. 7 is a block diagram depicting one embodiment of navigation functions of a data storage system, in accordance with one aspect of the invention.

Referring now to FIG. 7, in which navigation function calls 702-718 are depicted. Navigation function calls are invoked in response to a request from an application program, such as application program 302. Navigation function calls return a reference to a desired node and may be invoked through any programming method that supports subroutine, function or method calls. By way of non-limiting examples, navigation function calls 702-718 may be invoked using programming code in C, Basic, C++, Java, or scripting languages, such as Bourne Shell or perl. Similarly, function calls 702-718 may be remotely invoked using such methods as CORBA IDL or Java Remote Method Invocation.

Referring still to FIG. 7, function call 702 is a parent node request. Function call 704 corresponds to a next-sibling-node request, while function call 706 is a previous-sibling-node request. Function call 708 is a request to find the first child, and function call 710 is a parent request, as was function call 702. Function call 712 is a request for the last child of a node. As with function calls 704 and 706, function calls 714 and 716 correspond to a next-sibling and previous-sibling request, respectively.

It should be appreciated that other navigation function calls are possible, such as grandparent- and grandchild-node requests. Similarly, cousin node requests are possible, as is any other node relationship describable in familial terms or otherwise. In another embodiment, functions call may be based on application-specific relationships. By way of non-limiting examples, such relationships may include "is an example of," "has the property of," or "depends on." In a relational database, each row of a table may represent a node, where values of columns in rows are used as links to rows in other tables, according to one embodiment.

In another embodiment, nodes may be represented by unique tags, in which an application program issues requests for nodes having particular tags and the data storage system returns a reference to that tag.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for accessing data, comprising:
    issuing a request, by an application program, for a reference;
    storing a node in a memory as part of a data structure in response to said request, said data structure to include at least a portion of a data set and to be organized as a plurality of nodes:
        returning the reference to the application program, wherein issuing the request comprises issuing the request for one of a child node reference, a sibling node reference and a parent node reference;
        accessing the node, by the application program, using the reference; and
        issuing, by the application program, a de-allocation request for the node, wherein issuing the de-allocation request further comprises issuing the de-allocation request when the application program is no longer using the node, said de-allocation request to cause said application program to no longer be able to access said node using said reference.

2. A method for accessing data, comprising:
    issuing a request, by an application program, for a reference;
    storing a node in a memory as part of a data structure in response to said request, said data structure to include at least a portion of a data set and to be organized as a plurality of nodes;
    returning the reference to the application program, wherein issuing the request comprises issuing the request for one of a child node reference, a sibling node reference and a parent node reference;
    accessing the node, by the application program, using the reference; and
    issuing, by the application program, a de-allocation request for the node, wherein issuing the de-allocation request comprises issuing, by the application program, a de-allocation request for the node, said node to remain in the memory as part of the data structure until an available memory decreases below a predetermined amount.

3. A method for accessing data, comprising:
    issuing a request, by an application program, for a reference;
    storing a node in a memory as part of a data structure in response to said request, said data structure to include at least a portion of a data set and to be organized as a plurality of nodes;
    returning the reference to the application program, wherein issuing the request comprises issuing the request for one of a child node reference, a sibling node reference and a parent node reference;
    accessing the node, by the application program, using the reference; and
    issuing, by the application program, a de-allocation request for the node, wherein issuing the de-allocation request comprises issuing, by the application program, a de-allocation request for the node, where said node remains in the memory as part of the data structure until the application program issues a subsequent node request, and responding to said subsequent node request would cause an available memory to decrease below a predetermined amount.

4. A method for accessing data, comprising:
    issuing a request, by an application program, for a reference;
    storing a node in a memory as part of a data structure in response to said request, said data structure to include at least a portion of a data set and to be organized as a plurality of nodes;
    returning the reference to the application program, wherein issuing the request comprises issuing the request for one of a child node reference, a sibling node reference and a parent node reference;
    accessing the node, by the application program, using the reference; and using, by the application program, a plurality of references corresponding to the plurality of nodes of the data structure to access desired portions of the data set, said application program to have access only to nodes of the plurality of nodes for which references have been returned to the application program.

5. A method for accessing data comprising:
    issuing a request, by an application program, for a reference;
    storing a node in a memory as part of a data structure in response to said request, said data structure to include at least a portion of a data set and to be organized as a plurality of nodes;
    returning the reference to the application program, wherein issuing the request comprises issuing the request for one of a child node reference, a sibling node reference and a parent node reference; and
    accessing the node, by the application program, using the reference; and further comprising:
        parsing said data set and generating said data structure in the memory based at least on one or more node requests from the application program; and
        storing a pre-fetched node in the memory as part of the data structure, where the pre-fetched node corresponds to a portion of the data set not associated with the one or more node request.

6. A method for accessing data comprising:

issuing a request, by an application program, for a reference;

storing a node in a memory as part of a data structure in response to said request, said data structure to include at least a portion of a data set and to be organized as a plurality of nodes;

returning the reference to the application program, wherein issuing the request comprises issuing the request for one of a child node reference, a sibling node reference and a parent node reference; and accessing the node, by the application program, using the reference; and further comprising:

parsing said data set and generating said data structure in the memory based at least on one or more node requests from the application program; and receiving the data set over a network connection, said data set comprising a document.

7. A system comprising:

a processor; and a memory, coupled to the processor, having instruction sequences to cause said processor to:

receive a request, by an application program, for a reference, store a node as part of a data structure in response to said request, said data structure to include at least a portion of a data set and to be organized as a plurality of nodes, and, return the reference to the application program, wherein said instruction sequences to cause said processor to receive the request comprises instruction sequences to cause said processor to receive the request, by the application program, for one of a child node reference, a sibling node reference and a parent node reference, wherein said memory further includes instruction sequences to cause said processor to receive a de-allocation request, by the application program, for the node, and wherein said de-allocation request is made when the application program is no longer using the node, said de-allocation request to cause said application program to no longer be able to access said node using said reference.

8. A system comprising:

a processor; and a memory, coupled to the processor, having instruction sequences to cause said processor to:

receive a request, by an application program, for a reference, store a node as part of a data structure in response to said request, said data structure to include at least a portion of a data set and to be organized as a plurality of nodes, and, return the reference to the application program, wherein said instruction sequences to cause said processor to receive the request comprises instruction sequences to cause said processor to receive the request, by the application program, for one of a child node reference, a sibling node reference and a parent node reference, wherein said memory further includes instruction sequences to cause said processor to receive a de-allocation request, by the application program, for the node, and wherein said de-allocation request causes said node to remain as part of the data structure until an available memory decreases below a predetermined amount.

9. A system comprising:

a processor; and a memory, coupled to the processor, having instruction sequences to cause said processor to:

receive a request, by an application program, for a reference, store a node as part of a data structure in response to said request, said data structure to include at least a portion of a data set and to be organized as a plurality of nodes, and, return the reference to the application program, wherein said instruction sequences to cause said processor to receive the request comprises instruction sequences to cause said processor to receive the request, by the application program, for one of a child node reference, a sibling node reference and a parent node reference, wherein said application program uses a plurality of references corresponding to the plurality of nodes of the data structure to access desired portions of the data set, said application program to have access only to nodes of the plurality of nodes for which references have been returned to the application program.

10. A system comprising:

a processor; and a memory, coupled to the processor, having instruction sequences to cause said processor to:

receive a request, by an application program, for a reference, store a node as part of a data structure in response to said request, said data structure to include at least a portion of a data set and to be organized as a plurality of nodes, and, return the reference to the application program, wherein said instruction sequences to cause said processor to receive the request comprises instruction sequences to cause said processor to receive the request, by the application program, for one of a child node reference, a sibling node reference and a parent node reference, wherein said memory further includes instruction sequences to (i) parse said data set, which is received over a network connection, and (ii) generate said data structure based at least on one or more node requests from the application program.

11. The system of claim 10, wherein said memory further includes instruction sequences to cause said processor to store a pre-fetched node as part of the data structure, where the pre-fetched node corresponds to a portion of the data set not associated with the one or more node request.

12. A method for providing data to an application program, comprising:

receiving and parsing at least a portion of a data set over a network connection; issuing a node request to a data storage system, by an application program, for a reference, said reference to be one of a child node reference, a sibling node reference and a parent node reference;

storing a node in a memory of the data storage system as part of a data structure in response to said node request, said data structure to include at least a portion of the data set and to be organized as a plurality of nodes;

returning the reference to the application program, wherein issuing the request comprises issuing the request for one of a child node reference, a sibling node reference and a parent node reference;

accessing the node, by the application program, using the reference; and, issuing a de-allocation request, by the application program, for the node, said deallocation request to be made when the application program is no longer using the node, said de-allocation request to cause said application program to no longer be able to access said node using the reference.

13. The method of claim 12, wherein issuing the de-allocation request comprises issuing, by the application program, a de-allocation request for the node, where said node remains in the memory as part of the data structure until the application program issues a subsequent node request, and responding to said subsequent node request would cause an available memory to decrease below a predetermined amount.

14. The method of claim 12, further comprising using, by the application program, a plurality of references corresponding to the plurality of nodes of the data structure to access desired portions of the data set, said application program to have access only to nodes of the plurality of nodes for which references have been returned to the application program.

15. The method of claim 12, further comprising parsing said data set and generating said data structure in the memory based at least on one or more node requests from the application program.

16. The method of claim 15, further comprising storing a pre-fetched node in the memory as part of the data structure, where the pre-fetched node corresponds to a portion of the data set not associated with the one or more node request.

17. The method of claim 12, wherein said returning the reference to the application program comprises returning the reference to the application program in response to a system initialization.

18. A computer readable storage medium, storing computer program code comprising:

computer readable program code to receive and parse at least a portion of a data set over a network connection;

computer readable program code to issue a node request to a data storage system, by an application program, for a reference, said reference to be one of a child node reference, a sibling node reference and a parent node reference;

computer readable program code to store a node in a memory of the data storage system as part of a data structure in response to said node request, said data structure to include at least a portion of the data set and to be organized as a plurality of nodes for which references have been returned to the application program; c computer readable program code to return the reference to the application program;

computer readable program code to access the node, by the application program, using the reference;

computer readable program code to issue a de-allocation request, by the application program, for the node, said de-allocation request to be made when the application program is no longer using the node, said de-allocation request to cause said application program to no longer be able to access Said node using the reference; and, computer readable program code to store a pre-fetched node in the memory as part of the data structure, where the pre-fetched node corresponds to at least a portion of the data set not previously associated with a provided reference.

19. The computer readable medium of claim 18, wherein issuing the de-allocation request further causes said node to be removed from the memory.

20. The computer readable medium of claim 18, wherein issuing the de-allocation request comprises issuing, by the application program, a de-allocation request for the node, said node to remain in the memory as part of the data structure until an available memory decreases below a predetermined amount.

21. The computer readable medium of claim 18, wherein issuing the de-allocation request comprises issuing, by the application program, a de-allocation request for the node, where said node remains in the memory as part of the data structure until the application program issues a subsequent node request, and responding to said subsequent node request would cause an available memory to decrease below a predetermined amount.

22. The computer readable medium of claim 18, further comprising using, by the application program, a plurality of references corresponding to the plurality of nodes of the data structure to access desired portions of the data set, said application program to have access only to nodes of the plurality of nodes for which references have been returned to the application program.

23. The computer readable medium of claim 18, wherein the computer readable program code to return the reference to the application program comprises computer readable program code to return the reference to the application program in response to a system initialization.

* * * * *

UNITED STATES PATENT AND TRADEMARK OFFICE
CERTIFICATE OF CORRECTION

PATENT NO. : 7,430,586 B2 Page 1 of 1
APPLICATION NO. : 10/123933
DATED : September 30, 2008
INVENTOR(S) : Bradshaw et al.

It is certified that error appears in the above-identified patent and that said Letters Patent is hereby corrected as shown below:

In Column 14, line 3, after "program;" please delete "c".

Signed and Sealed this

Sixteenth Day of December, 2008

JON W. DUDAS
*Director of the United States Patent and Trademark Office*